US010210009B2

(12) United States Patent
Yocam et al.

(10) Patent No.: US 10,210,009 B2
(45) Date of Patent: Feb. 19, 2019

(54) SELECTING A VIRTUAL MACHINE ON A MOBILE DEVICE BASED UPON CONTEXT OF AN INCOMING EVENT

(71) Applicant: T-Mobile USA, Inc., Bellevue, WA (US)

(72) Inventors: Eric W. Yocam, Sammamish, WA (US); Ahmad Arash Obaidi, Bellevue, WA (US); Andrew Lee Watts, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 200 days.

(21) Appl. No.: 14/964,186

(22) Filed: Dec. 9, 2015

(65) Prior Publication Data

US 2017/0168862 A1 Jun. 15, 2017

(51) Int. Cl.
*G06F 9/455* (2018.01)
*H04W 8/22* (2009.01)

(52) U.S. Cl.
CPC .......... *G06F 9/45558* (2013.01); *H04W 8/22* (2013.01); *G06F 2009/4557* (2013.01); *G06F 2009/45595* (2013.01)

(58) Field of Classification Search
CPC .................................................. G06F 9/45533
USPC ........................................................... 718/1
See application file for complete search history.

(56) References Cited

U.S. PATENT DOCUMENTS

| 7,472,381 | B2* | 12/2008 | Fox ..................... G06F 9/45504 709/202 |
| 8,718,611 | B2* | 5/2014 | Balasaygun ........ G06F 9/45533 455/414.1 |
| 2004/0128394 | A1* | 7/2004 | Knauerhase ............ H04L 29/06 709/229 |
| 2010/0074420 | A1* | 3/2010 | Bauchot .............. H04M 1/6505 379/88.02 |
| 2010/0146504 | A1* | 6/2010 | Tang ................... G06F 9/45537 718/1 |
| 2010/0235833 | A1* | 9/2010 | Huang .................. G06F 21/575 718/1 |
| 2010/0333088 | A1* | 12/2010 | Rogel ................. G06F 9/45533 718/1 |
| 2011/0302247 | A1* | 12/2011 | Narayanan .......... H04L 12/5855 709/205 |
| 2011/0314467 | A1* | 12/2011 | Pearson .................. G06F 9/455 718/1 |
| 2012/0157165 | A1* | 6/2012 | Kim ..................... G06F 21/6218 455/566 |
| 2012/0165075 | A1* | 6/2012 | Kim ...................... G06F 9/4443 455/566 |
| 2013/0130669 | A1* | 5/2013 | Xiao ................. H04M 1/72572 455/418 |

(Continued)

*Primary Examiner* — Mehran Kamran
(74) *Attorney, Agent, or Firm* — Lee & Hayes, PC

(57) ABSTRACT

A method of selecting a virtual machine (VM) on a mobile device within a wireless communication network based upon context of an incoming event. For example, a virtual intelligence engine can select a VM to handle an incoming phone call based upon the context of the phone call. If the phone call is work-related, then the virtual intelligence engine may select a first VM, while if the incoming phone call is a personal phone call, then the virtual intelligence engine may select a second VM different from the first VM. The VMs can utilize different operating systems.

20 Claims, 3 Drawing Sheets

(56) References Cited

U.S. PATENT DOCUMENTS

| | | | | |
|---|---|---|---|---|
| 2013/0145366 A1* | 6/2013 | Newell | .............. | G06F 9/45545 |
| | | | | 718/1 |
| 2013/0159417 A1* | 6/2013 | Meckler | .................. | H04L 67/22 |
| | | | | 709/204 |
| 2013/0167137 A1* | 6/2013 | Bansod | ..................... | G06F 8/61 |
| | | | | 717/175 |
| 2014/0149521 A1* | 5/2014 | Broz | ..................... | H04W 4/206 |
| | | | | 709/206 |
| 2014/0157265 A1* | 6/2014 | Alanis | ................ | G06F 9/45558 |
| | | | | 718/1 |
| 2014/0170978 A1* | 6/2014 | Wolman | .................... | G06F 9/54 |
| | | | | 455/41.2 |
| 2014/0364148 A1* | 12/2014 | Block | ................... | H04W 4/02 |
| | | | | 455/456.3 |
| 2016/0036963 A1* | 2/2016 | Lee | .......................... | G06F 8/61 |
| | | | | 455/418 |
| 2016/0155332 A1* | 6/2016 | Wang | ................ | G01C 21/3685 |
| | | | | 340/932.2 |
| 2016/0373573 A1* | 12/2016 | Bivens | .................... | H04M 3/02 |
| 2016/0378517 A1* | 12/2016 | Zellermayer | ....... | G06F 9/45533 |
| | | | | 718/1 |

\* cited by examiner

SELECTING A VIRTUAL MACHINE ON A MOBILE DEVICE BASED UPON CONTEXT OF AN INCOMING EVENT

BACKGROUND

In recent years, telecommunication devices have advanced from offering simple voice calling services within wireless networks to providing users with many new features. Telecommunication devices now provide messaging services such as email, text messaging, and instant messaging; data services such as Internet browsing; media services such as storing and playing a library of favorite songs; location services; and many others. In addition to the new features provided by the telecommunication devices, users of such telecommunication devices have greatly increased. Such an increase in users is only expected to continue and in fact, it is expected that there could be a growth rate of twenty times more users in the next few years alone. Such an increase in wireless traffic has no place to go and thus, the performance of wireless networks will suffer.

Telecommunication devices, referred to herein as mobile devices, are often used in multiple contexts. For example, a user may use their mobile device for both work-related events as well as personal events. Indeed, an employer may set up the mobile device with various parameters, rules, subscriptions, etc., pertaining to work-related events. When the employee no longer works for the employer, the employer may wipe out or erase information on the mobile device related to work. However, this can also lead to the elimination of personal information on the user's mobile device. Additionally, if the user wishes to only handle work-related events at a particular point in time with the mobile device or wishes to handle only personal matters with the mobile device at a particular point in time, it is generally not possible to keep them separate.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
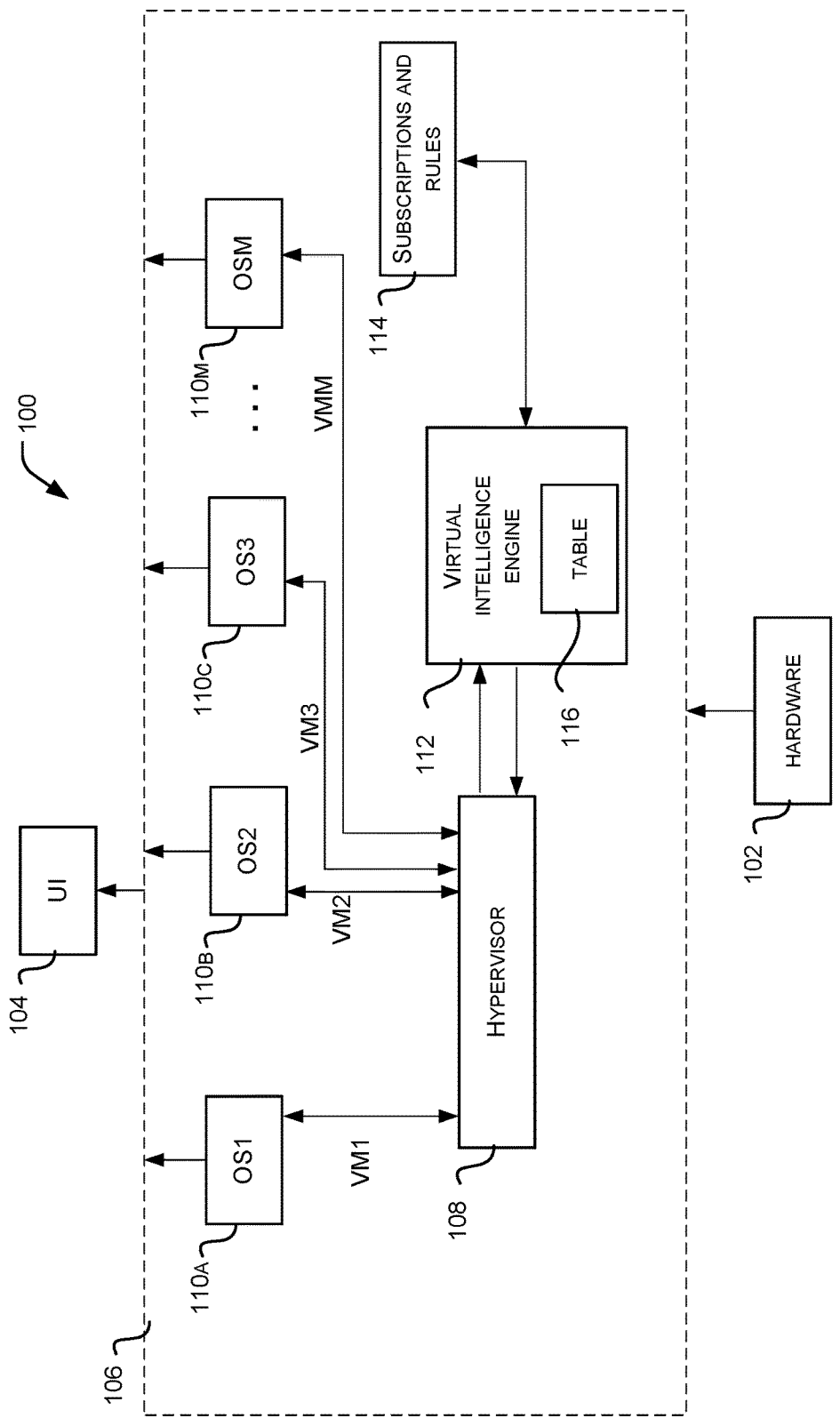
FIG. 1 schematically illustrates a mobile device, in accordance with various embodiments.

Described herein is an architecture for a mobile device that can switch among various virtual machines (VMs) defined on one or more processors of the mobile device. For example, a virtual intelligence engine can select a VM to handle an incoming phone call based upon the context of the phone call. For example, if the phone call is work-related, then the virtual intelligence engine may select a first VM, while if the incoming phone call is a personal phone call, then the virtual intelligence engine may select a second VM different from the first VM.

In an embodiment, the mobile device may include hardware, such as, for example, sensors, a display, radios, etc. The mobile device also generally includes a user interface (UI) such as, for example, a touchscreen (which can also serve as the display), a keyboard, a touchpad, etc. The mobile device generally also includes one or more processors, memory and other electrical components.

In an embodiment, the one or more processors generally include an abstraction layer. The abstraction layer includes a hypervisor that is utilized to define and operate one or more VMs on the one or more processors. The abstraction layer also includes a virtual intelligence engine that interacts with the hypervisor.

Based upon subscriptions and/or rules, the virtual intelligence engine can interact with the hypervisor in order to switch among the VMs based upon various events and the context surrounding the events. For example, if a phone call is received by the mobile device and based upon the subscriptions a user of the mobile device wishes to separate phone calls based upon the context of the phone call, the virtual intelligence engine may control the hypervisor to cause a first VM to handle the phone call. For example, this can be based upon the phone call being a personal phone call. If a second phone call is received and the context of the second phone call is different than the first phone call, then based upon the rules and subscriptions, the virtual intelligence engine may select a second VM to handle the second phone call. Other events can include various messages, emails, calendar events and reminders, etc.

In embodiments, VMs may utilize different operating systems. Thus, work-related events may be handled by one or more VMs that operate utilizing a first operating system while personal events may be handled by one or more VMs that operate utilizing a second and different operating system. Such an arrangement may be at the request of an employer and allow the employer to remove data, applications, etc. if the user of the mobile device ceases employment with the employer. If desired, multiple instances of operating systems may be active on multiple VMs.

In embodiments, a user interface can be provided that allows the user of the mobile device to select which "mode of operation" in which the user wishes to operate the mobile device. For example, a swipe on a touchscreen to the right may indicate that the user wishes to operate the mobile device in a personal mode of operation and thus only deal with personal events. Likewise, a swipe on the touchscreen to the left may indicate that the user wishes to operate the mobile device in only a work-related mode and thus only handle work-related events. An upward or downward swipe of the touchscreen may indicate that the user simply wants the mobile device to operate and handle any events regardless of the context of the events.

Depending upon a mode of operation, the virtual intelligence engine may store information related to events that are currently not being handled by the mobile device. For example, if the mobile device is operating in a personal mode and work-related events are received by the mobile device, the information related to the work-related events may be stored. For example, the virtual intelligence engine may cause a first VM to store the voicemail for a work-related phone call that is received by the mobile device. The virtual intelligence engine may provide a notification to the user of the mobile device depending upon the subscriptions and rules.

One or more VMs may be designated as default VMs. For example, if a phone call is received and the virtual intelligence engine cannot classify the phone call as either work-related or personal, then the virtual intelligence engine may have the hypervisor select a default VM to handle the phone call. Depending upon rules and subscriptions, the phone call may be provided to the user of the mobile device or may be placed into voicemail and the user may be notified.

FIG. 1 schematically illustrates architecture for a mobile device 100. The mobile device 100 generally includes hardware 102 such as, for example, various sensors, a display, radios, etc. More or less hardware may be included depending upon the type of mobile device. The mobile device 100 also includes one or more user interfaces 104, which may be in the form of, for example, a touchscreen (which can also serve as the display), a keyboard, a touchpad, etc.

The mobile device 100 is generally capable of accessing a wireless communication network wirelessly in order to perform various functions such as, for example, make phone calls, send messages, access the Internet, etc. The mobile device 10 may comprise any appropriate device for communicating over the wireless communication network. Such devices include mobile telephones, cellular telephones, mobile computers, Personal Digital Assistants (PDAs), radio frequency devices, handheld computers, laptop computers, tablet computers, palmtops, pagers, integrated devices combining one or more of the preceding devices, and/or the like. The mobile device 100 may communicate with a wireless communication network using one or more standards, including but not limited to, Global System for Mobile Communications (GSM), Internet Protocol (IP) Multimedia Subsystem (IPS or IMS), Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (including Institute of Electrical and Electronics Engineers (IEEE) 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like.

The mobile device 100 further includes one or more processors, memory, and other electrical components (not illustrated). An abstraction layer 106 is provided within the one or more processors. The abstraction layer 106 includes a hypervisor 108. The hypervisor 108 configures and operates multiple VMs 110. In the example illustrated in FIG. 1, VMs 110a, 110b, 110c through 110m are illustrated. Depending upon the overall configuration of the mobile device 100 and the abstraction layer 106, there may only be two VMs 110 or there may be many more.

Each VM 110 operates utilizing an operating system (OS). Thus, the first VM1 110a utilizes OS1 and the second VM2 110b utilizes OS2. In embodiments, OS1 and OS2 may be the same and thus, two instances of the same operating system are being operated on OS1 and OS2. In other embodiments, OS1 and OS2 may be different and thus, two different operating systems are being utilized and operated within the mobile device 100 in the abstraction layer 106.

A virtual intelligence engine 112 is provided and interacts with the hypervisor 108 to help select and control operation of the VMs 110. The interface of the virtual intelligence engine 112 between the virtual intelligence engine 112 and the hypervisor 108 is such that various and different types of hypervisors 108 can be provided within the abstraction layer 106.

Subscriptions and rules 114 are provided to give input into the virtual intelligence engine 112 so that the virtual intelligence engine 112 can select which VM 110 should be operated. A table 116 within the virtual intelligence engine 112 is provided for how to process events. For example, the table 116 may list various subscriber and publisher events, based upon the subscriptions and rules 114, in order to process incoming events for the mobile device 100 and determine which VM 110, and thereby which OS, to select for operation and handling of an incoming event. Thus, the virtual intelligence engine 112 can switch among the various VMs 110.

Some VMs 110 may utilize the same OS. This can be done in order to separate events based upon context such as work vs. personal but the user of the mobile device 100 wants to only utilize one OS. Also, it can allow for updates to software and firmware within the mobile device 100 to be made more easily.

When VMs 110 operate utilizing different OSs, this can allow for a user to try a new OS without first giving up their old OS. Additionally, by utilizing two OSs, apps, data, etc., an "old" or previous OS can be kept even when switching over to utilizing a new OS. Also, work-related events may be handled by one or more VMs 110 that operate utilizing a first OS while personal events may be handled by one or more VMs 110 that operate utilizing a second and different operating system. Such an arrangement may be at the request of an employer and allow the employer to remove data, applications, etc. if the user of the mobile device 100 ceases employment with the employer.

As another example, the mobile device 100 may include a sensor that operates utilizing the Global Positioning System (GPS). Based upon input from the sensor, the abstraction layer 106 can realize the user of the mobile device 100 is at work and thus, automatically place the mobile device 100 into a mode of operation that is work-related and thereby utilize the appropriate VMs 110. Alternatively, the sensor may indicate that the mobile device 100 is not in a work-related area and thus, automatically switch the mode of operation to personal and thereby utilize the appropriate VMs 110.

In embodiments, the user interface 104 can allow the user of the mobile device 100 to select which "mode of operation" in which the user wishes to operate the mobile device 100. For example, a swipe on a touchscreen to the right may indicate that the user wishes to operate the mobile device 100 in a personal mode of operation and thus, only deal with personal events. Likewise, a swipe on the touchscreen to the left may indicate that the user wishes to operate the mobile device 100 in only a work-related mode and thus, only handle work-related events. An upward or downward swipe of the touchscreen may indicate that the user simply wants the mobile device 100 to operate and handle any events regardless of the context of the events. The user interface 104 can be in a different form in different mobile devices and may be activated in different manners.

Depending upon a mode of operation, the virtual intelligence engine 112 may store information related to events that are currently not being handled by the mobile device 100. For example, if the mobile device 100 is operating in a personal mode and work-related events are received by the mobile device 100, the information related to the work-related events may be stored. For example, the virtual intelligence engine 112 may cause the first VM 110a to store the voicemail for a work-related phone call that is received by the mobile device 100. The virtual intelligence engine 110 may provide a notification to the user of the mobile device depending upon the subscriptions and rules 114.

In embodiments, one or more VMs 110 may be designated as default VMs. For example, if a phone call is received and the virtual intelligence engine 112 cannot classify the phone call as either work-related or personal, then the virtual intelligence engine 112 may have the hypervisor 108 select a default VM 110 to handle the phone call. Depending upon the rules and subscriptions 114, the phone call may be provided to the user of the mobile device 100 or may be stored in voicemail. The user may be notified about the voicemail.

In embodiments, the virtual intelligence engine 112 controls all the hardware 102 in the mobile device 102. Also, in embodiments, the user of the mobile device 100 can provide the subscriptions and rules 114. Alternatively, or in addition to, an employer, school administrator, other type of leader, etc. can provide subscriptions and rules 112. While the primary example described herein involves work vs. personal events, other events can be used to define subscriptions and rules 114. For example, but not limited to, the subscriptions and rules 114 can be based upon school, travel, location, family, friends, activity, etc. Additionally, more than two classifications can be used if desired. For example, the subscriptions and rules can be based upon work, personal, school and location.

Figure 2:
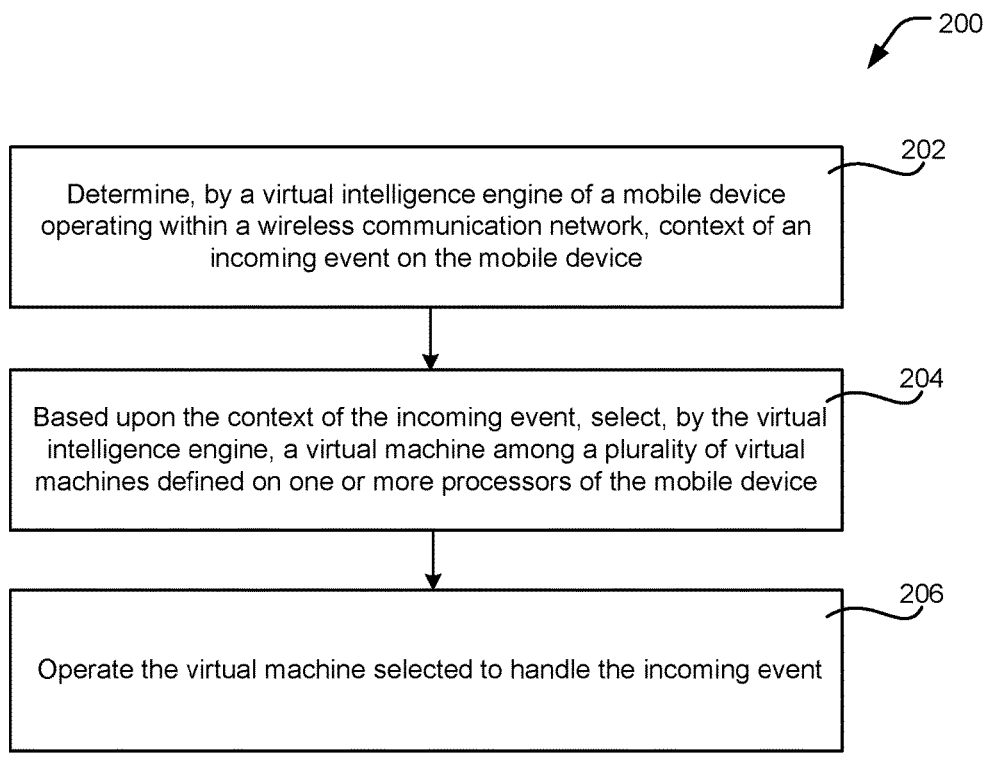
FIG. 2 is a flowchart illustrating an example method of selecting a virtual machine on a mobile device based upon context of an incoming event.

FIG. 2 is a flowchart illustrating a method 200 of selecting a virtual machine on a mobile device based upon context of an incoming event, e.g., mobile device 100. As illustrated, at block 202, a virtual intelligence engine of a mobile device operating within a wireless communication network determines context of an incoming event on the mobile device. At block 204, based upon the context of the incoming event, the virtual intelligence engine selects a virtual machine among a plurality of virtual machines defined on one or more processors of the mobile device. At block 206, the virtual machine selected operates to handle the incoming event.

Figure 3:
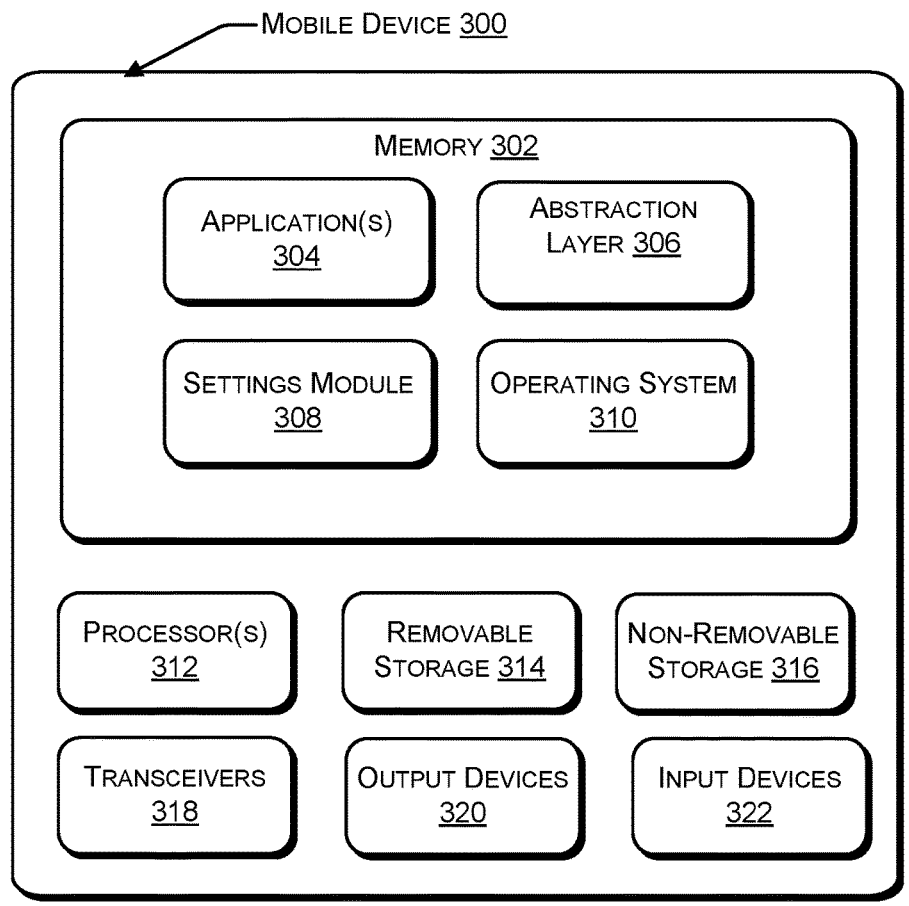
FIG. 3 illustrates a component level view of an example mobile device configured similarly to the mobile device of FIG. 1.

FIG. 3 illustrates a component level view of a mobile device 300, such as mobile device 100, configured to select a virtual machine on the mobile device 300 based upon context of an incoming event. As illustrated, the mobile device 300 comprises a system memory 302 storing application(s) 304, an abstraction layer 306, a settings module 308, and an operating system 310. Also, the mobile device 300 includes processor(s) 312, a removable storage 314, a non-removable storage 316, transceivers 318, output device(s) 320, and input device(s) 322.

In various implementations, system memory 302 is volatile (such as RAM), non-volatile (such as ROM, flash memory, etc.) or some combination of the two. The abstraction layer 306 may be an example of the abstraction layer 106. The operating system 310 may be any sort of operating system and may enable the abstraction layer 306 to operate as described above with regard to FIG. 1. The system memory 302 may also store any of the other components described above with respect to FIG. 1 (VMs, hypervisor, virtual intelligence engine, subscription and rules, etc.).

In some implementations, the processor(s) 312 is a central processing unit (CPU), a graphics processing unit (GPU), or both CPU and GPU, or any other sort of processing unit.

The mobile device 300 may also include additional data storage devices (removable and/or non-removable) such as, for example, magnetic disks, optical disks, or tape. Such additional data storage may include removable storage 314 and non-removable storage 316.

Non-transitory computer-readable media may include volatile and nonvolatile, removable and non-removable tangible, physical media implemented in technology for storage of information, such as computer readable instructions, data structures, program modules, or other data. System memory 302, removable storage 314 and non-removable storage 316 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the user device 300. Any such non-transitory computer-readable media may be part of the user device 300.

In some implementations, the transceivers 318 include any sort of transceivers known in the art. For example, the transceivers 318 may include a radio transceiver that performs the function of transmitting and receiving radio frequency communications via an antenna. Also or instead, the transceivers 318 may include wireless modem(s) to may facilitate wireless connectivity with other computing devices. Further, the transceivers 318 may include wired communication components, such as an Ethernet port, for communicating with other networked devices.

In some implementations, the output devices 320 include any sort of output devices known in the art, such as a display (e.g., a liquid crystal display), speakers, a vibrating mechanism, or a tactile feedback mechanism. Output devices 320 also include ports for one or more peripheral devices, such as headphones, peripheral speakers, or a peripheral display.

In various implementations, input devices 322 include any sort of input devices known in the art. For example, input devices 322 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:

selecting a mode of operation of a plurality of modes of operation of a mobile device, the plurality of modes of operation including a context-independent mode for handling any incoming event without user action;

determining, as a determined context and by a virtual intelligence engine of a mobile device operating within a wireless communication network, a context of an incoming event on the mobile device, the incoming event including a phone call, a message, or an email, wherein the determined context is (i) work-related or (ii) personal;

selecting, as a selected virtual machine, by the virtual intelligence engine and based upon the context of the incoming event, a virtual machine among a plurality of virtual machines, the plurality of virtual machines defined on one or more processors of the mobile device, the selected virtual machine being associated with the context of the incoming event;

operating the selected virtual machine to handle the incoming event, wherein the selected virtual machine is configured to handle the incoming event having the determined context; and storing, by the virtual intelligence engine and without user action, information generated by another virtual machine configured to handle the incoming event having the determined context, wherein (1) context-independent mode is not selected and (2) the selected virtual machine is not configured to handle the incoming event having the determined context.

2. The method of claim 1, wherein at least two of the plurality of virtual machines utilize different operating systems.

3. The method of claim 1, wherein selecting a virtual machine among a plurality of virtual machines defined on one or more processors of the mobile device comprises (i) selecting a first virtual machine if the incoming event is work-related or (ii) selecting a second virtual machine if the incoming event is personal.

4. The method of claim 3, wherein (i) the first virtual machine utilizes a first operating system and (ii) the second virtual machine utilizes a second operating system.

5. The method of claim 3, wherein (i) the first virtual machine utilizes a first operating system and (ii) the second virtual machine utilizes the first operating system.

6. The method of claim 1, further comprising determining if the incoming event is a phone call, a message or an email.

7. The method of claim 6, further comprising:
determining a mode of operation of the mobile device; and
based upon the mode of operation, storing the information related to the incoming event.

8. The method of claim 7, further comprising notifying a user of the mobile device of a presence of the information.

9. The method of claim 7, wherein determining a mode of operation of the mobile device comprises determining whether the mobile device is operating in (i) a work-related mode of operation or (ii) a personal mode of operation.

10. The method of claim 3, wherein (i) the first virtual machine utilizes a first operating system and (ii) the second virtual machine utilizes a second operating system.

11. The method of claim 3, wherein (i) the first virtual machine utilizes a first operating system and (ii) the second virtual machine utilizes the first operating system.

12. An apparatus comprising:
a non-transitory storage medium; and
instructions stored in the non-transitory storage medium, the instructions being executable by the apparatus to:
provide a user interface that enables a user of a mobile device to select a mode of operation of a plurality of modes of operation of the mobile device, the plurality of modes of operation including a context-independent mode for handling any event without user action;
receive a user input at the user interface;
select one of the plurality of modes of operation based on the user input;
determine, by a virtual intelligence engine as a determined context, a context of an event on a mobile device, the event including a phone call, a message, or an email, wherein the determined context is (i) work-related or (ii) personal;
select, by the virtual intelligence engine as a selected virtual machine and based upon the user-selected mode of operation, a virtual machine among a plurality of virtual machines, the plurality of virtual machines defined on one or more processors of the mobile device;
operate the selected virtual machine to handle the event, wherein the selected virtual machine is configured to handle the event having the determined context; and
store, by the virtual intelligence engine and without user action, information generated by another virtual machine configured to handle the event having the determined context, wherein (1) context-independent mode is not selected and (2) the selected virtual machine is not configured to handle the event having the determined context.

13. The apparatus of claim 12, wherein at least two of the plurality of virtual machines utilize different operating systems.

14. The apparatus of claim 12, wherein the apparatus (i) selects a first virtual machine if the event is work-related or (ii) selects a second virtual machine if the event is personal.

15. The apparatus of claim 14, wherein (i) the first virtual machine utilizes a first operating system and (ii) the second virtual machine utilizes a second operating system.

16. The apparatus of claim 14, wherein (i) the first virtual machine utilizes a first operating system and (ii) the second virtual machine utilizes the first operating system.

17. The apparatus of claim 12, wherein the instructions are further executable by the apparatus to determine if the event is a phone call, a message or an email.

18. The apparatus of claim 17, wherein the instructions are further executable by the apparatus to:
determine a mode of operation of the mobile device; and
based upon the mode of operation, store information related to the event.

19. The apparatus of claim 18, wherein the instructions are further executable by the apparatus to notify a user of the mobile device of a presence of the information.

20. The apparatus of claim 18, wherein the apparatus determines whether the mobile device is operating in (i) a work-related mode of operation or (ii) a personal mode of operation.

* * * * *